July 9, 1957  W. J. HARPER  2,798,823
FLUORESCENT SCREEN FOR X-RAY IMAGE TUBE
AND METHOD FOR PREPARING SAME
Filed Oct. 21, 1954
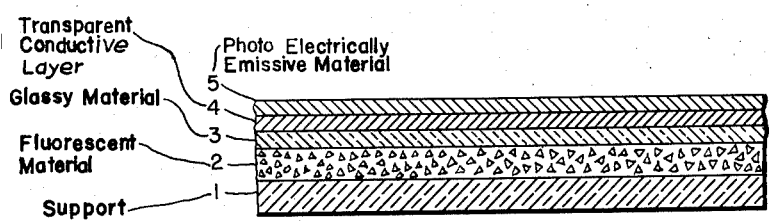
WITNESSES
INVENTOR
Walter J. Harper
BY
ATTORNEY

United States Patent Office 2,798,823
Patented July 9, 1957

2,798,823

FLUORESCENT SCREEN FOR X-RAY IMAGE TUBE AND METHOD FOR PREPARING SAME

Walter J. Harper, Wilkins Township, Allegheny County, Pa., assignor to Westinghouse Electric Corporation, East Pittsburgh, Pa., a corporation of Pennsylvania Application October 21, 1954, Serial No. 463,718

7 Claims. (Cl. 117—33.5)

My invention relates to fluorescent screens and, in particular, to screens for generating an electron image which is a duplicate of an image field of X-rays or other radiation. Screens of this type are employed, for example, in X-ray image intensifiers, such as that described in Mason et al. U. S. Patent 2,523,132.

Screens of the prior art on which my present invention is an improvement comprise a glass support of watch-glass shape faced on one side with a thin fluorescent layer onto which the X-ray image is projected, and on the other side with photoelectrically-emissive material. The incident X-rays generate light-rays in the fluorescent layer which, passing through the glass, produces a corresponding electron image at the outer surface of the photoelectric material. The light rays naturally spread in passing through the glass, and this, in some degree, blurs the image causing electron emission at the photoelectric layer; hence, it is desirable that the glass shall be as thin as possible. However, adequate mechanical strength is a limitation in this respect; for example, it requires that the thickness of a screen five inches in diameter be around six mils. The principal object of my present invention is to provide a screen of adequate strength in which the layer intervening between the fluorescent material and the photoelectrically-emissive material may be only one micron or less. This is accomplished by utilizing, for mechanical support, a glass or metal surface on the opposite side of the fluorescent material from the photoelectric layer, and preventing actual contact between the fluorescent material and the photoelectric layer by interposing an extremely thin septum of glassy material deposited by condensation from the vapor phase.

One object of my invention is accordingly to provide a new and improved form of fluorescent screen for radiation image converters.

Another object is to provide a novel arrangement in which materials likely to react chemically with each other may be positioned closely adjacent to each other while such chemical reaction is substantially prevented.

Another object is to provide a method for fabricating structures such as I have just described.

Other objects of my invention will become apparent upon reading the following taken in connection with the drawings in which the single figure is a schematic view in section of a fluorescent screen embodying the principles of my invention.

Referring in detail to the drawing, the support-element of my fluorescent screen comprises a sheet 1 of glass or other substance transparent to the radiation to be converted and thick enough to withstand the mechanical stresses likely to be encountered in service. On sheet 1, I deposit a layer 2 of fluorescent material, such as zinc sulfide, zinc cadmium sulfide, zinc cadmium sulfide selenide, calcium tungstate, cadmium tungstate, barium lead sulfate or other substance emitting light in response to the X-rays or other radiation to be converted. The substances just named may be deposited as particles about forty microns in diameter through a ten percent solution of potassium silicate to a thickness of about one hundred milligrams per square centimeter. The potassium silicate solution is siphoned off and the layer dried by subjecting it to a vacuum of about ten microns of mercury for some twenty minutes. A thin film of nitrocellulose or other organic film-forming material is then laid down like a tent supported on the tips of the phosphor particles in layer 2 in accordance with a procedure well known in the art of aluminizing the screens of cathode ray tubes. The assembly is then placed in a container evacuated to about $10^{-5}$ mm. of mercury and coated by evaporation with a layer 3 of a glassy material such as one or more materials from the group calcium fluoride, barium floride, magnesium fluoride, calcium silicate, silicon monoxide, germanium oxide, this layer being from 1,000 to 10,000 angstroms thick with 2,000 angstroms representing a value preferable for most purposes. The nitrocellulose layer is then removed by heating the structure for about an hour in air at 350° C., or in oxygen at around 250° C. Although not necesary in all cases, it will frequently be found desirable to coat the layer 3 with a conductive layer 4 by heating it to about 400° C. and exposing it to the fumes of heated stannous chloride in a manner well known in the electronic tube art.

The screen may then be installed in the envelope in which it is to operate and be coated with a layer 5 of cesiated antimony or other photoelectrically-emissive material sensitive to the radiation emitted by fluorescent material 2 by procedure well known in the electron tube art. Such a procedure is described in detail in Longini Patent 2,666,864 issued January 19, 1954 and assgined to the assignee of this application.

I claim as my invention:

1. The method of producing a screen which comprises coating a support-element with a fluorescent material, depositing a layer of organic film-forming material supported at widely-spaced points on said fluorescent material, condensing a layer of vaporizable glassy material on the free side of said organic material, heating said organic material for a period of time whereby said organic material substantially disappears, and coating said glassy material with a photoelectric material said glassy material being substantially light transparent and substantially unreactive with said fluorescent material, said organic material and said photoelectric material.

2. The method specified in claim 1 in which said glassy material is coated with a substantially transparent layer of electrically conductive material before said photoelectric material is deposited.

3. The method specified in claim 1 in which said layer of glassy material is deposited to a thickness of from one thousand to ten thousand angstroms.

4. The method specified in claim 1 in which said glassy material comprises at least one material selected from the group consisting of calcium fluoride, barium fluoride, magnesium fluoride, calcium silicate, silicon monoxide and germanium oxide.

5. The method specified in claim 3 in which the fluorescent material comprises at least one material selected from the group consisting of zinc sulfide, zinc cadmium sulfide, zince cadmium sulfide selenide, calcium tungstate, cadmium tungstate and barium lead sulfate.

6. A screen comprising in order, a supporting-element substantially transparent to X-rays, an X-ray phosphor layer comprising at least one material selected from the group consisting of zinc sulfide, zinc cadmium sulfide, zinc cadmium sulfide selenide, calcium tungstate, cadmium tungstate and barium lead sulfate, a layer from one thousand to ten thousand angstroms thick consisting of one or more substances selected from the group consisting of calcium fluoride, barium fluoride, magnesium fluoride, calcium silicate, silicon monoxide and germanium oxide, and a layer of photoelectric material.

7. The screen specified in claim 6 in which the phosphor layer comprises particles up to forty microns in diameter with a density of about one hundred milligrams of phosphor per square centimeter of screen area.

References Cited in the file of this patent

UNITED STATES PATENTS

| | | |
|---|---|---|
| 2,129,296 | Wurstlin | Sept. 6, 1938 |
| 2,597,617 | Campbell | May 20, 1952 |
| 2,600,579 | Ruedy et al. | June 17, 1952 |
| 2,689,189 | Hushley | Sept. 14, 1954 |